(12) United States Patent
Owaki et al.

(10) Patent No.: US 11,097,687 B2
(45) Date of Patent: Aug. 24, 2021

(54) WEBBING RETRACTOR

(71) Applicant: KABUSHIKI KAISHA TOKAI-RIKA-DENKI-SEISAKUSHO, Aichi-ken (JP)

(72) Inventors: Tomoya Owaki, Aichi-ken (JP); Takuhiro Saito, Aichi-ken (JP); Kazuhiro Yamada, Aichi-ken (JP); Atsushi Nishino, Aichi-ken (JP)

(73) Assignee: KABUSHIKI KAISHA TOKAI-RIKA-DENKI-SEISAKUSHO, Aichi (JP)

( * ) Notice: Subject to any disclaimer, the term of this patent is extended or adjusted under 35 U.S.C. 154(b) by 170 days.

(21) Appl. No.: 16/682,382

(22) Filed: Nov. 13, 2019

(65) Prior Publication Data
US 2020/0164833 A1 May 28, 2020

(30) Foreign Application Priority Data
Nov. 28, 2018 (JP) .............................. JP2018-222600

(51) Int. Cl.
*B60R 22/46* (2006.01)
*B60R 22/405* (2006.01)
*B60R 22/44* (2006.01)
*B60R 22/28* (2006.01)
*B60R 22/34* (2006.01)

(52) U.S. Cl.
CPC ............ *B60R 22/46* (2013.01); *B60R 22/405* (2013.01); *B60R 22/3413* (2013.01); *B60R 22/44* (2013.01); *B60R 2022/287* (2013.01); *B60R 2022/468* (2013.01); *B60R 2022/4666* (2013.01)

(58) Field of Classification Search
CPC ....... B60R 22/44; B60R 22/46; B60R 22/405; B60R 22/3413; B60R 2022/287; B60R 2022/468; B60R 2022/4666
See application file for complete search history.

(56) References Cited

U.S. PATENT DOCUMENTS

| 10,421,431 | B2 * | 9/2019 | Nagata | .................... B60R 22/48 |
| 10,457,248 | B2 * | 10/2019 | Umakoshi | ............... B60R 22/34 |
| 10,618,762 | B2 * | 4/2020 | Osaki | ..................... B65H 18/10 |
| 10,654,443 | B2 * | 5/2020 | Nagata | .................... B60R 22/46 |

(Continued)

FOREIGN PATENT DOCUMENTS

JP 2009-255866 A 5/2011

*Primary Examiner* — Sang K Kim
(74) *Attorney, Agent, or Firm* — Roberts Calderon Safran & Cole P.C.

(57) ABSTRACT

A webbing retractor includes a spool, a motor, a force limiter mechanism, a first rotating body, a second rotating body, a ratchet gear, a pawl body and a control section. The ratchet gear is provided at one of the first rotating body or the second rotating body. The pawl body is provided at another of the first rotating body or the second rotating body. The pawl body can engage with the ratchet gear in a case in which the first rotating body rotates toward one side, and engagement of the pawl body with the ratchet gear being cancelled in a case in which the first rotating body rotates toward another side. The control section drives the motor to rotate in reverse, such that the first rotating body rotates toward another side in a case in which a physical amount relating to load of the passenger exceeds a predetermined value during forward rotational driving.

9 Claims, 9 Drawing Sheets

(56) References Cited

U.S. PATENT DOCUMENTS

2017/0341626 A1* 11/2017 Nagata .................... B60R 22/46
2018/0009412 A1*  1/2018 Umakoshi ............... B60R 22/34
2018/0215343 A1*  8/2018 Nagata ................ B60R 22/4671
2018/0237246 A1*  8/2018 Osaki ..................... B65H 18/10

* cited by examiner

WEBBING RETRACTOR

CROSS-REFERENCE TO RELATED APPLICATION

This application is based on and claims priority under 35 USC 119 from Japanese Patent Application No. 2018-222600 filed on Nov. 28, 2018, the disclosure of which is incorporated by reference herein.

BACKGROUND

Technical Field

The present disclosure relates to a webbing retractor in which a spool is driven to rotate by the driving force of a motor.

Related Art

Japanese Patent Application Laid-Open (JP-A) No. 2009-255866 discloses a webbing retractor in which a spool is driven to rotate by the driving force of a motor. This webbing retractor has a pre-crash function in which, when the vehicle enters into a state of rapid deceleration or when a collision with an obstacle at the front side of the vehicle is predicted, the motor is driven and the spool is rotated, and the webbing is thereby taken-up.

Further, this webbing retractor has, between a locking mechanism and the spool, a torsion shaft that serves as a force limiter mechanism. When the load that is inputted from the passenger to the webbing becomes excessive, the force of restraining the passenger is eased due to the torsion shaft twisting.

In the above-described webbing retractor that is disclosed in JP-A No. 2009-255866, if, at the time when the pre-crash function works, the force limiter mechanism operates with the motor still in a driving state, another force, such as driving force from the motor side or the like, is added to the force limiter load.

SUMMARY

In view of the above-described circumstances, an object of the present disclosure is to provide a webbing retractor that, in a case in which a spool is driven to rotate by the driving force of a motor, can suppress the addition of another force, such as driving force from the motor side or the like, to the force limiter load.

A webbing retractor of a first aspect of the present disclosure has a spool that takes-up a webbing that is applied to a passenger; a motor that drives the spool to rotate; a force limiter mechanism that allows pulling-out of the webbing in a case in which load of a given amount or more is applied to the webbing, pulling-out of the webbing being limited; a first rotating body that is rotated due to driving force of the motor being transmitted thereto; a second rotating body that, by being rotated, rotates the spool; a ratchet gear that is provided at one of the first rotating body or the second rotating body; a pawl body that is provided at another of the first rotating body or the second rotating body, and that can engage with the ratchet gear in a case in which the first rotating body rotates toward one side, and engagement of the pawl body with the ratchet gear being cancelled in a case in which the first rotating body rotates toward another side; and a control section that, in a case in which a collision of a vehicle is predicted, drives the motor to rotate forward such that the first rotating body rotates toward the one side, and, in a case in which a physical amount relating to load of the passenger exceeds a predetermined value during forward rotational driving, drives the motor to rotate in reverse, such that the first rotating body rotates toward the other side.

In a webbing retractor of a second aspect of the present disclosure, in the webbing retractor of the first aspect, in a case in which the physical amount relating to the load of the passenger exceeds the predetermined value during forward rotational driving of the motor, the control section drives the motor to rotate in reverse, such that the first rotating body rotates toward the other side at a speed higher than the second rotating body.

In a webbing retractor of a third aspect of the present disclosure, the webbing retractor of the first aspect or the second aspect further has a third rotating body that is provided on a driving path from the motor to the first rotating body, and that suppresses transmission of torque of a set value or greater.

In a webbing retractor of a fourth aspect of the present disclosure, the webbing retractor of any one of the first aspect through the third aspect further has a rotational angle sensor that senses a rotational angle of the spool, wherein the control section causes a case in which the rotational angle exceeds a threshold value to be the case in which the physical amount relating to the load of the passenger exceeds the predetermined value.

In a webbing retractor of a fifth aspect of the present disclosure, the webbing retractor of any one of the first aspect through the third aspect further has an acceleration sensor that senses acceleration of the vehicle, wherein the control section causes a case in which the acceleration exceeds a threshold value to be the case in which the physical amount relating to the load of the passenger exceeds the predetermined value.

In a webbing retractor of a sixth aspect of the present disclosure, the webbing retractor of any one of the first aspect through the third aspect further has an extension amount sensor that senses an amount of extension of the webbing, wherein the control section causes a case in which the amount of extension exceeds a threshold value to be the case in which the physical amount relating to the load of the passenger exceeds the predetermined value.

In the webbing retractor of the first aspect, the webbing can be taken-up due to the spool being driven to rotate by the motor. Here, driving force from the motor to the spool is transmitted by engagement of the ratchet gear and the pawl body. In a case in which a collision of the vehicle is sensed, due to the motor being driven to rotate forward, the ratchet gear and the pawl body engage, and the spool takes-up the webbing. Further, in a case in which, during the forward rotational driving of the motor, a physical amount relating to the load of the passenger exceeds a predetermined value, the engagement of the ratchet gear and the pawl body can be cancelled due to the motor being driven to rotate reversely. Due thereto, the driving force from the motor side to the spool is cut-off. In accordance with this webbing retractor, in a case in which the spool is being driven to rotate by driving force of the motor, the addition of another force, such as driving force from the motor side or the like, to the force limiter load can be suppressed.

In the webbing retractor of the second aspect, by rotating the first rotating body toward the other side at a higher speed than the second rotating body, the engagement of the ratchet gear and the pawl body can be cancelled even in a case in which the webbing continues to be pulled-out and the second rotating body is in the midst of rotating toward the other side.

In the webbing retractor of the third aspect, due to the transmission of torque on the driving path from the motor to the first rotating body being suppressed, overload that reaches the motor can be suppressed.

In the webbing retractor of the fourth aspect, the rotational angle of the spool is made to be the physical amount relating to the load of the passenger. In accordance with this webbing retractor, the rotational angle sensor can be provided at any of the rotating bodies that rotate in conjunction with the spool. Therefore, assembly into a device is easy, and compactness of the device can be devised.

In the webbing retractor of the fifth aspect, the acceleration of the vehicle is made to be the physical amount relating to the load of the passenger. In accordance with this webbing retractor, the cost of the device can be kept down because the acceleration sensor that is provided at the vehicle can be used in common.

In the webbing retractor of the sixth aspect, the amount of extension of the webbing is made to be the physical amount relating to the load of the passenger. In accordance with this webbing retractor, by cutting-off the driving force of the motor following the extending of the webbing that accompanies movement of the passenger, effects of the driving force of the motor on the force limiter load can be eliminated at an early stage.

BRIEF DESCRIPTION OF THE DRAWINGS

Exemplary embodiments of the present disclosure will be described in detail based on the following figures, wherein.

DETAILED DESCRIPTION

First Embodiment

A webbing retractor of a first embodiment is described by using FIG. 1 through FIG. 7.

Figure 1:
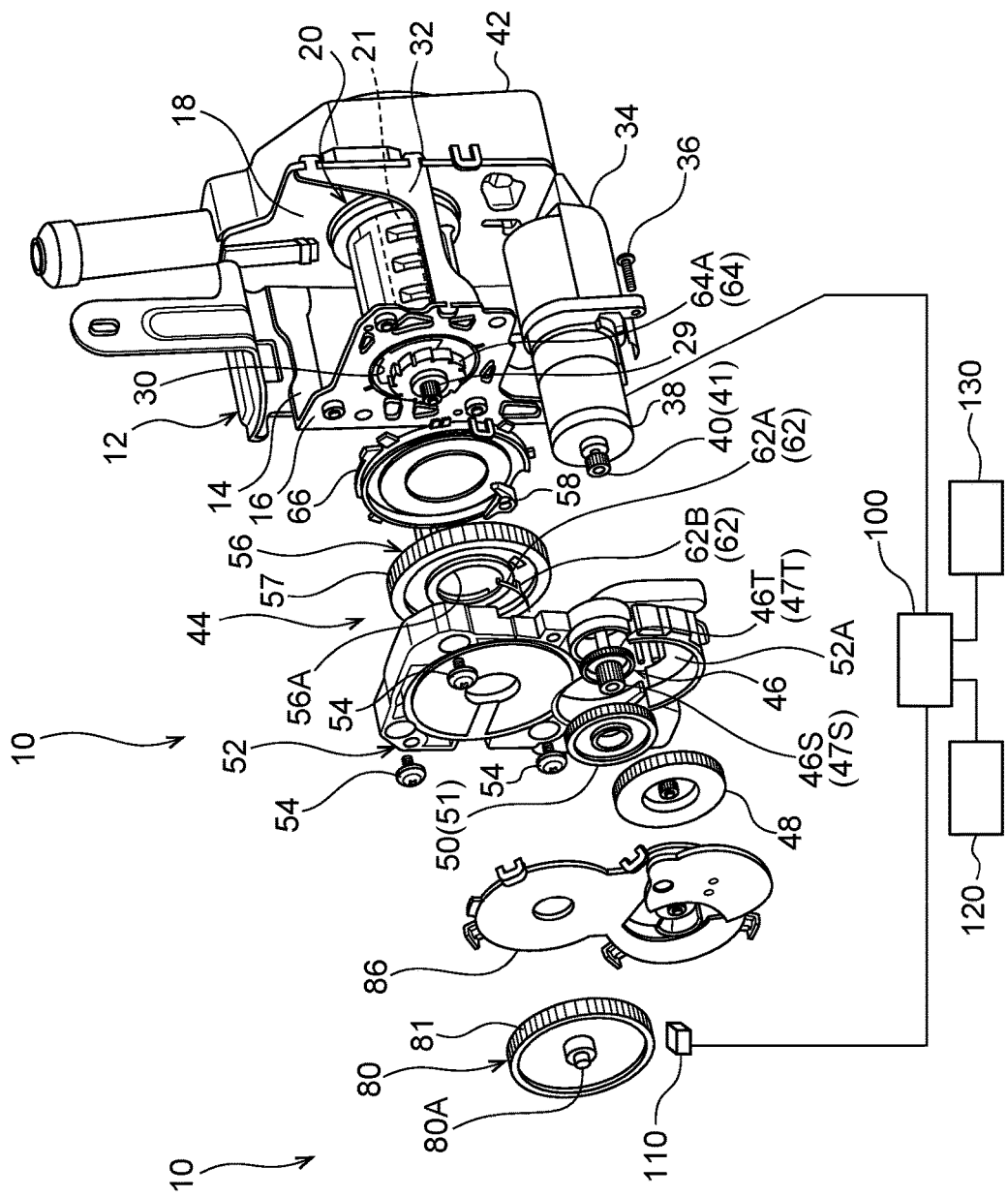
FIG. 1 is an exploded perspective view showing, in a disassembled manner, a webbing retractor relating to first and second embodiments.

An exploded perspective view of a webbing retractor 10 relating to an embodiment of the present disclosure is shown in FIG. 1. As shown in this drawing, the webbing retractor 10 has a frame 12. The frame 12 has a back plate 14 that is substantially plate-shaped. The webbing retractor 10 is fixed to a vehicle body due to this back plate 14 being fixed to the vehicle body by fastening means such as bolts or the like. A pair of leg pieces 16, 18 extend, parallel to one another, from the transverse direction both ends of the back plate 14. A spool 20 that is manufactured by die casting or the like is rotatably disposed between the leg pieces 16, 18. Note that a connecting piece 32 spans between the leg piece 16 and the leg piece 18.

The spool 20 is formed substantially in the shape of a cylindrical tube. The proximal end portion of a webbing 22 (see FIG. 6 and FIG. 7), which is formed in the shape of an elongated strip, is fixed to the spool 20. When the spool 20 is rotated in one direction around the axis thereof (hereinafter, this direction is called the "take-up direction"), the webbing 22 is taken-up, from the proximal end side thereof, in layers onto the outer peripheral portion of the spool 20. Further, if the webbing 22 is pulled from the distal end side thereof, the webbing 22 that has been taken-up on the outer peripheral portion of the spool 20 is pulled-out, and, accompanying this, the spool 20 rotates in the direction opposite to the rotational direction at the time when the webbing 22 is taken-up. (Hereinafter, the direction of rotation of the spool 20 at the time when the webbing 22 is pulled-out is called the "pull-out direction".)

A supporting shaft portion 29 stands erect at the axially central portion of the leg piece 16 side end portion of the spool 20. The supporting shaft portion 29 substantially coaxially passes-through a round hole 30 that is formed in the leg piece 16, and projects-out to the exterior of the frame 12. Further, a ratchet wheel 64 that is described later is fixed to the projecting direction proximal end side of the supporting shaft portion 29. Due thereto, the ratchet wheel 64 can rotate together with the spool 20.

Further, a motor 38 is fixed, via a motor cover 34 and a screw 36, to a gear housing 52 that is described later. The motor 38 is disposed beneath the spool 20, between the pair of leg pieces 16, 18 of the frame 12. An A gear 40, at whose outer peripheral portion plural external teeth 41 are formed, is fixed to the output shaft of the motor 38. The motor 38 is electrically connected to a control device 100 that is described later.

On the other hand, a supporting shaft portion stands erect at the leg piece 18 side end portion of the spool 20. This supporting shaft portion substantially coaxially passes-through a ratchet hole that is formed in the leg piece 18, and projects-out to the exterior of the frame 12. A lock base, at which is supported a lock plate that structures a portion of a locking mechanism, is fixed to the supporting shaft portion. At the time of an emergency of the vehicle (at the time when the vehicle rapidly decelerates or the like), the lock plate projects-out from the lock base and meshes-together with the inner peripheral portion of the ratchet hole formed in the leg piece 18, and rotation of the spool 20 in the pull-out direction is limited. Further, a cover 42 that covers the above-described locking mechanism and the like is fixed to the leg piece 18.

One side (the device right side in FIG. 1) portion of a torsion shaft 21, which serves as an energy absorbing member and structures a force limiter mechanism, is disposed so as to pass-through the radial direction central side of the lock base. Relative rotation between the lock base and the one side (the device right side in FIG. 1) portion of the torsion shaft 21 is limited.

The torsion shaft 21 is rod-shaped, and the length direction thereof is the same as the axial direction of the spool 20. Another side (the device left side in FIG. 1) portion of the torsion shaft 21 is connected to the other side (the device left side in FIG. 1) portion of the spool 20. Relative rotation of the other side (the device left side in FIG. 1) portion of the torsion shaft 21 and the spool 20 is limited. Due thereto, relative rotation of the lock base with resect to the spool 20 is limited, and the lock base is rotated integrally with the spool 20.

The gear housing 52 that houses a clutch 44, a B gear 46, an OL gear 48 and a C gear 50 is fixed to the leg piece 16 via screws 54.

Figure 2:
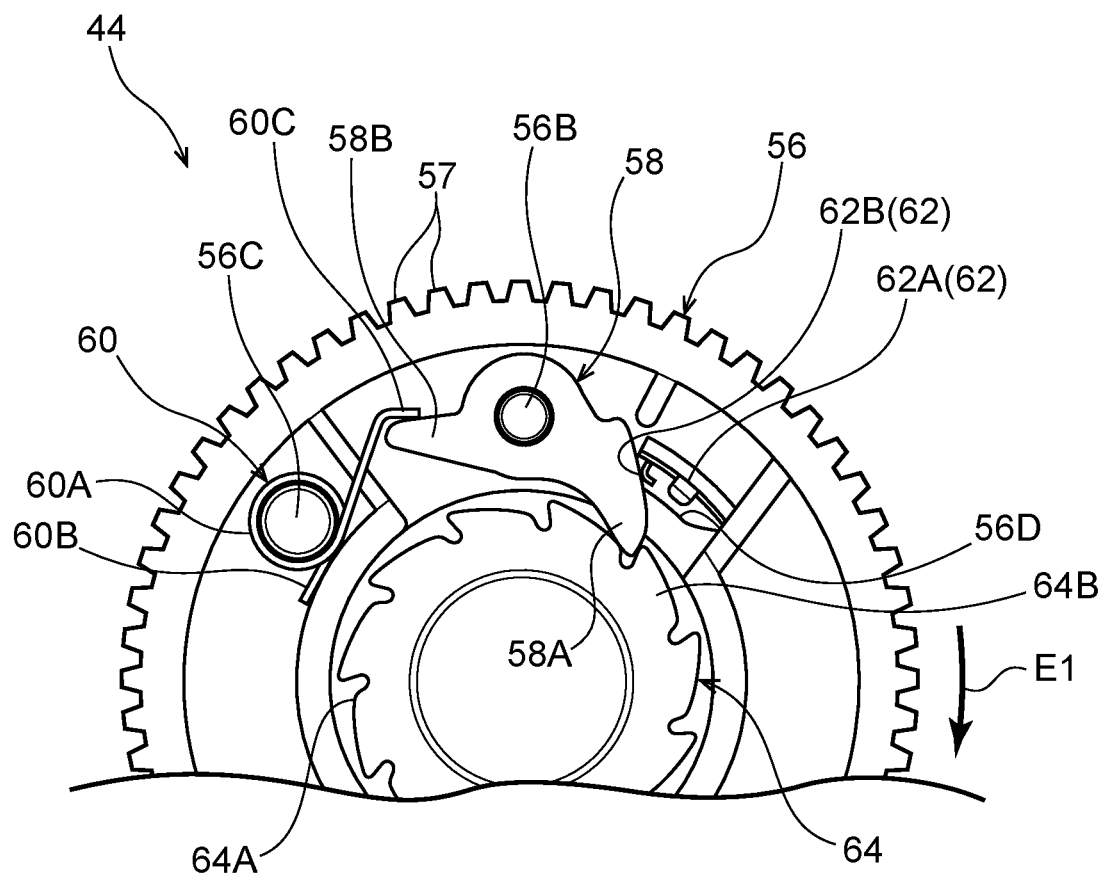
FIG. 2 is a side view in which a clutch is seen from a leg piece of a frame, and shows a state in which a ratchet engaging portion of a lock bar is engaged with a ratchet gear.

As shown in FIG. 2, the clutch 44 is structured to include a clutch gear 56 that is formed in the shape of a ring, a lock bar 58 and a return spring 60 that are mounted to the clutch gear 56, a friction spring 62, and the ratchet wheel 64 that is fixed to the spool 20. Note that the clutch gear 56 in the present embodiment corresponds to the first rotating body, and the ratchet wheel 64 corresponds to the second rotating body.

Concretely, plural external teeth 57 are formed at the outer peripheral portion of the clutch gear 56. As shown in FIG. 1, an insert-through hole 56A, which is round and through which the supporting shaft portion 29 of the spool 20 is inserted, is formed in the inner peripheral portion of the clutch gear 56. Further, as shown in FIG. 2, a lock bar supporting shaft 56B and a return spring supporting shaft 56C, which project-out toward the leg piece 16 side and are disposed with an interval therebetween in the peripheral direction of the clutch gear 56, stand erect at the radial direction intermediate portion of the clutch gear 56. Moreover, a friction spring insert-through hole 56D, through which a portion of the friction spring 62 is inserted, is formed in the radial direction intermediate portion of the clutch gear 56. As shown in FIG. 1, the above-described clutch gear 56 is accommodated within an accommodating recess that is formed in the leg piece 16 side of the gear housing 52. Movement of the clutch gear 56 toward the leg piece 16 side is restricted due to a first seat 66 being mounted to the gear housing 52.

As shown in FIG. 2, the lock bar 58 is formed substantially in a half-moon shape as seen in the axial direction of the clutch gear 56. By being supported at the lock bar supporting shaft 56B that is provided at the clutch gear 56, the lock bar 58 is made to be able to tilt. One end portion of the lock bar 58 is a ratchet engaging portion 58A that engages with a ratchet gear 64A that is described later. Another end portion of the lock bar 58 is a return spring abutment portion 58B that is abutted by the return spring 60. Note that the lock bar 58 of the present embodiment corresponds to the pawl body.

The return spring 60 has a wound portion 60A that is wound in an annular shape and is supported at the return spring supporting shaft 56C that is provided at the clutch gear 56. One end portion of the return spring 60 is an anchor portion 60B that extends-out from the wound portion 60A and is anchored on a portion of the clutch gear 56. Another end portion of the return spring 60 is an abutting portion 60C that extends-out from the wound portion 60A and abuts the return spring abutment portion 58B of the lock bar 58. Further, due to the urging force of the return spring 60 being inputted to the return spring abutment portion 58B of the lock bar 58, the ratchet engaging portion 58A of the lock bar 58 moves away from the ratchet wheel 64.

As shown in FIG. 1, the friction spring 62 is provided between the clutch gear 56 and the gear housing 52. This friction spring 62 has a sliding-contact portion 62A, which slidingly-contacts the gear housing 52 at the time when the clutch gear 56 is rotated, and a pushing portion 62B which extends-out from the sliding-contact portion 62A toward the clutch gear 56 side and is inserted-through a friction spring insert-through hole 56D that is formed in the clutch gear 56.

As shown in FIG. 2, the sawtoothed ratchet gear 64A is formed at the outer peripheral portion of the ratchet wheel 64. The ratchet gear 64A is structured by plural engaged external teeth 64B that are inclined toward an axial direction another side (the arrow E2 direction side in FIG. 3) and with which the ratchet engaging portion 58A of the lock bar 58 engages. Further, as shown in FIG. 1, the ratchet wheel 64 is fixed to the supporting shaft portion 29 of the spool 20 by press-fitting or the like.

As shown in FIG. 2, at the time when the clutch gear 56 is rotated toward an axial direction one side (the arrow E1 direction side), the pushing portion 62B of the friction spring 62 pushes the ratchet engaging portion 58A of the lock bar 58. Moreover, when the force, which is inputted from the pushing portion 62B of the friction spring 62 to the ratchet engaging portion 58A of the lock bar 58, exceeds the urging force of the return spring 60, the lock bar 58 is tilted, and the ratchet engaging portion 58A engages with the engaged external tooth 64B of the ratchet wheel 64. Due thereto, the rotational force that is inputted to the clutch gear 56 (i.e., the driving force of the motor 38) is inputted to the ratchet wheel 64 via the lock bar 58, and the spool 20 is rotated in the take-up direction together with the ratchet wheel 64.

Figure 3:
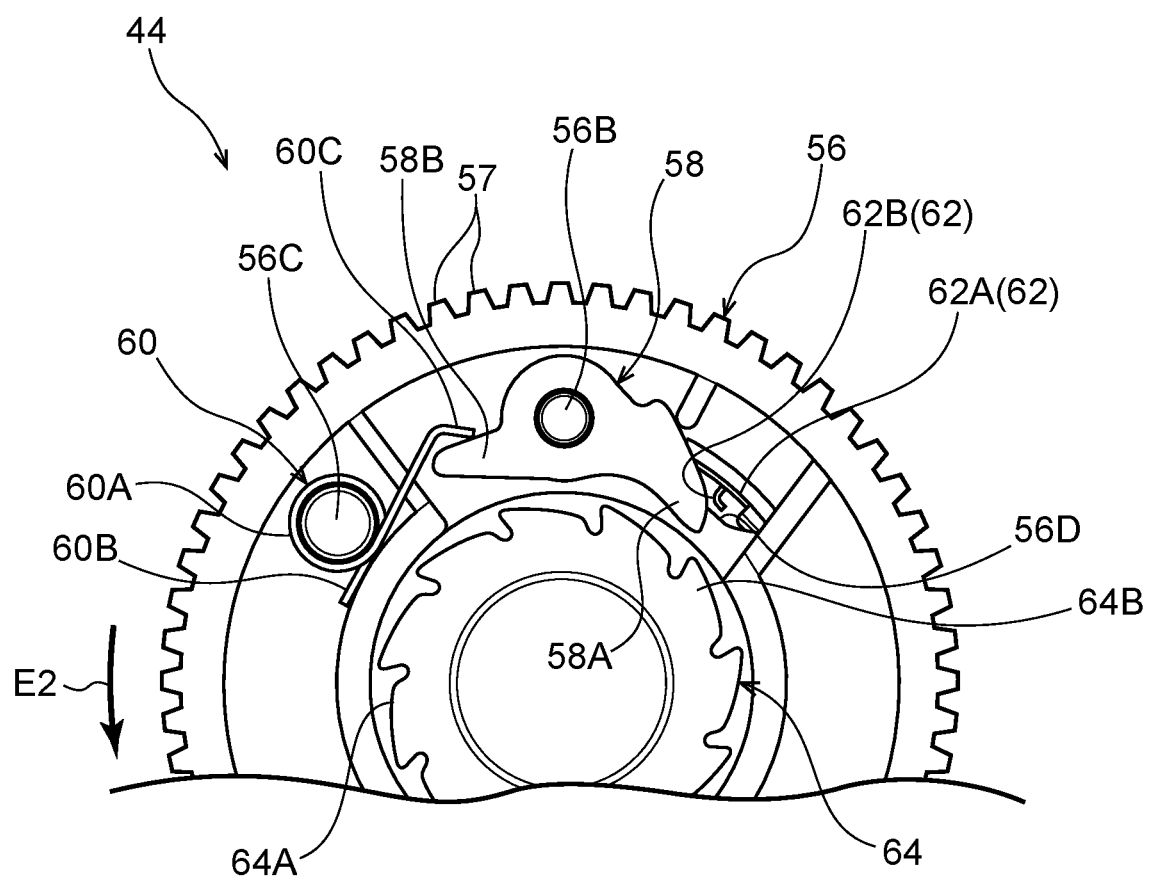
FIG. 3 is a side view that corresponds to FIG. 2 and in which the clutch is seen from the leg piece of the frame, and shows a state in which the ratchet engaging portion of the lock bar is not engaged with the ratchet gear.

In contrast, as shown in FIG. 3, at the time when the clutch gear 56 is rotated toward the axial direction another side (the arrow E2 direction side), the force, which is inputted from the pushing portion 62B of the friction spring 62 to the ratchet engaging portion 58A of the lock bar 58, does not exceed the urging force of the return spring 60. Therefore, the ratchet engaging portion 58A of the lock bar 58 does not engage with the engaged external teeth 64B of the ratchet wheel 64. Due thereto, the rotational force that is inputted to the clutch gear 56 (i.e., the driving force of the motor 38) is not inputted to the ratchet wheel 64 via the lock bar 58.

As shown in FIG. 1, the B gear 46 has a large diameter portion 46T, at whose outer peripheral portion are formed plural external teeth 47T that mesh-together with the external teeth 41 of the A gear 40, and a small diameter portion 46S, that is disposed coaxially with the large diameter portion 46T and is formed integrally with the large diameter portion 46T. The outer diameter of the small diameter portion 46S is set to be smaller than the outer diameter of the large diameter portion 46T. Further, plural external teeth 47S, with which the OL gear 48 that is described later meshes, are formed at the outer peripheral portion of the small diameter portion 46S.

Figure 4:
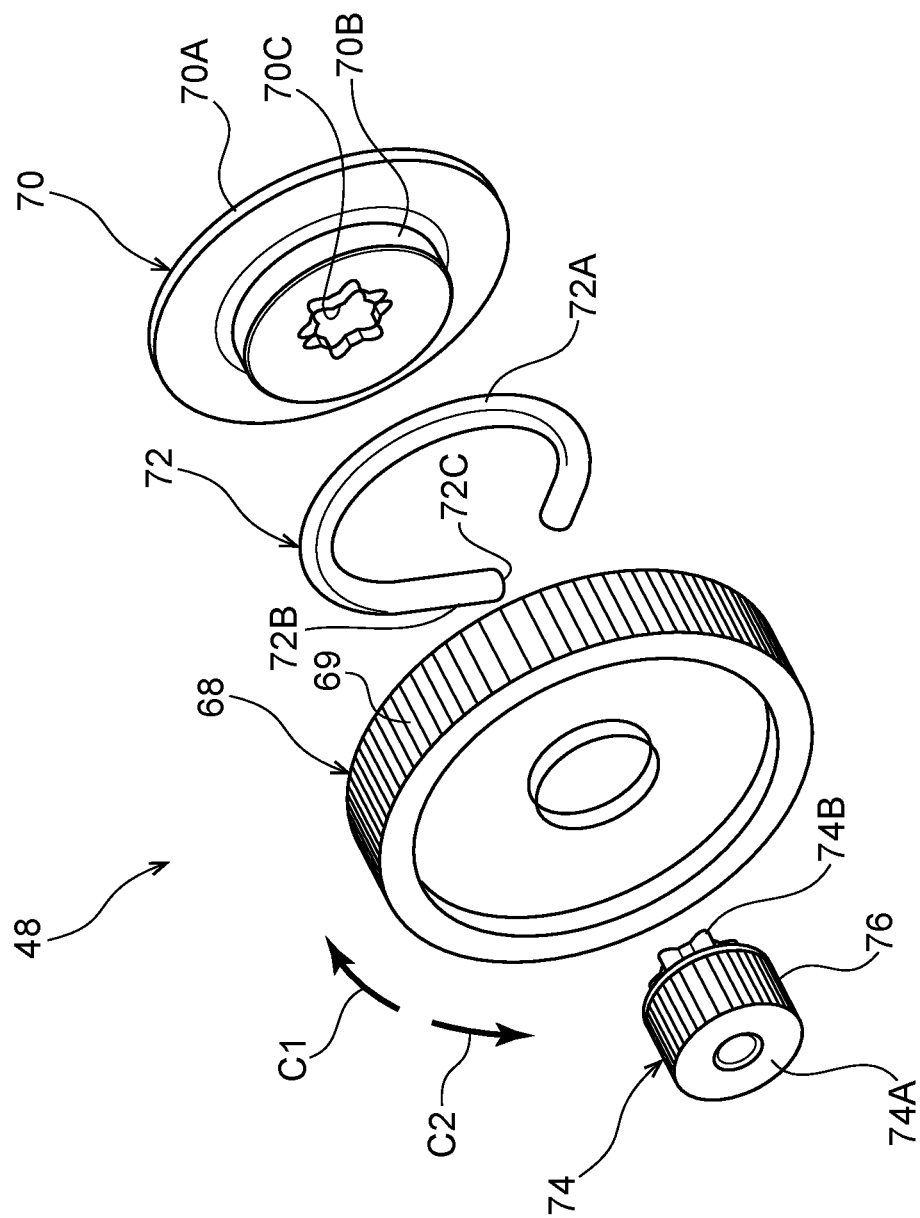
FIG. 4 is an exploded perspective view showing an OL gear in a disassembled manner.

As shown in FIG. 4, the OL gear 48 is structured to include an input gear 68 that is rotated due to rotational force of the B gear 46 (see FIG. 1) being transmitted thereto, a rotor 70 that is disposed coaxially with the input gear 68, a clutch spring 72 that is provided between the input gear 68 and the rotor 70, and an output gear 74 that is engaged with the rotor 70 so as to be able to rotate integrally with the rotor 70. Note that the OL gear 48 of the present embodiment corresponds to the third rotating body.

Figure 5:
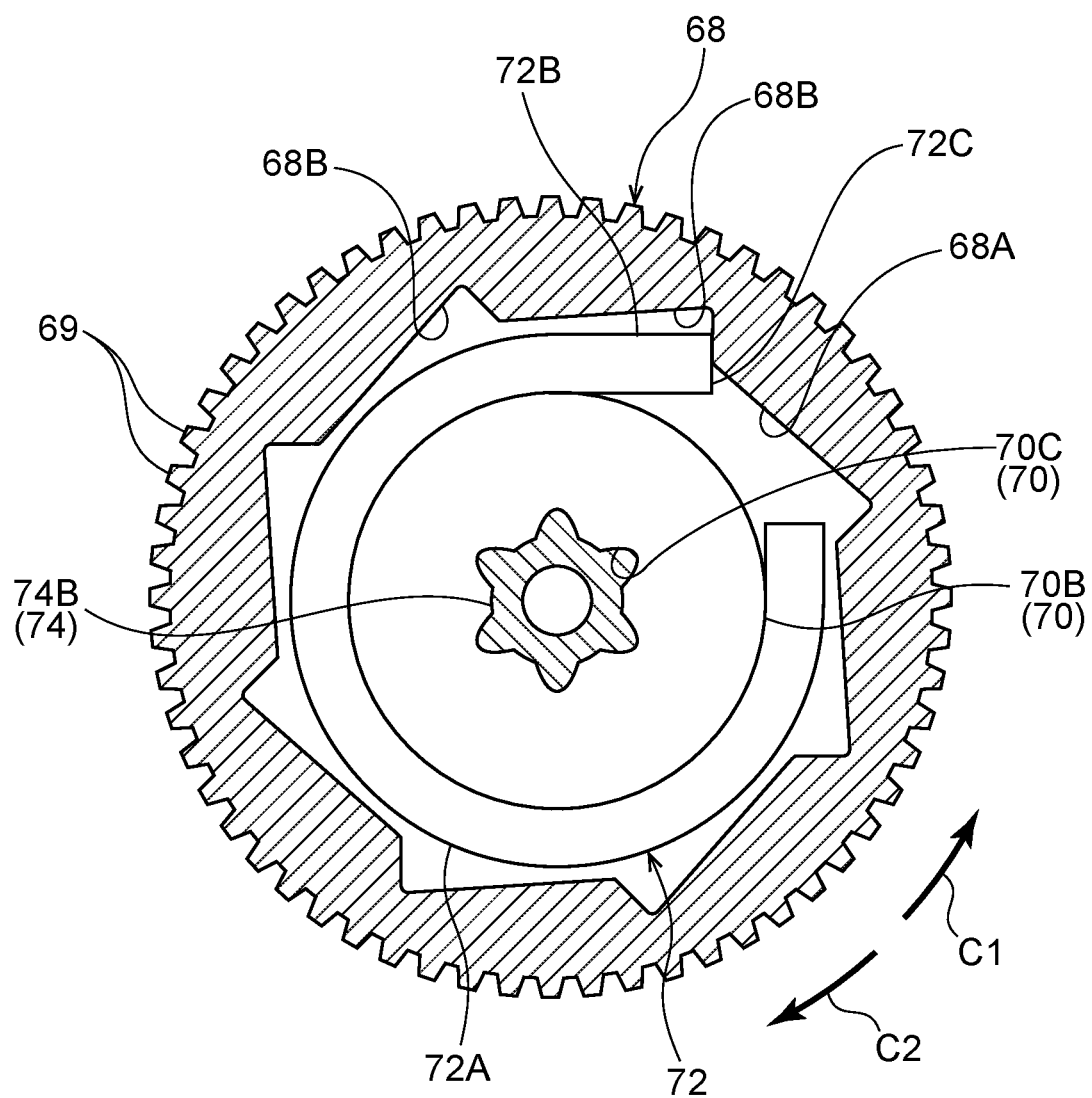
FIG. 5 is a cross-sectional view showing a cross-section in which the OL gear is cut along the radial direction.

The input gear 68 is formed in the shape of a disc at whose outer peripheral portion are formed plural external teeth 69 that mesh-together with the external teeth 47S that are formed at the small diameter portion 46S of the B gear 46. Further, as shown in FIG. 5, a cavity portion 68A, whose rotor 70 side is open and in which the clutch spring 72 and a wind-around portion 70B of the rotor 70 that are described later are disposed, is formed in the input gear 68. Moreover, plural clutch spring engaging concave portions 68B are formed along the peripheral direction of the input gear 68, at the input gear 68 radial direction outer side region of the cavity portion 68A.

As shown in FIG. 4, the rotor 70 has a disc portion 70A that is formed in the shape of a disc, and the wind-around portion 70B that is formed in the shape of a solid cylinder that projects-out from the radial direction inner side region of the disc portion 70A toward the input gear 68 side. Further, a spline-shaped engaging hole 70C which with the output gear 74 engages is formed in the axially central portion of the wind-around portion 70B.

The clutch spring 72 has a curved portion 72A that is curved in an annular shape. In the state before the clutch spring 72 is mounted to the wind-around portion 70B of the rotor 70, the inner diameter of the curved portion 72A is an outer diameter that is slightly smaller than the outer diameter of the wind-around portion 70B of the rotor 70. Due to the inner diameter of the curved portion 72A enlarging and the curved portion 72A engaging with the outer peripheral surface of the wind-around portion 70B of the rotor 70, the curved portion 72A is pressed against and fit onto the wind-around portion 70B of the rotor 70.

Further, as shown in FIG. 5, one end portion of the clutch spring 72 is an engaging portion 72B that engages with the clutch spring engaging concave portions 68B of the input gear 68. Due to the input gear 68 being rotated toward one side (in the arrow C1 direction), one of the clutch spring engaging concave portions 68B of the input gear 68 pushes an end 72C of the engaging portion 72B. Due thereto, the rotational force that is inputted to the input gear 68 is transmitted via the clutch spring 72 to the rotor 70 and the output gear 74.

When, accompanying the rotation of the input gear 68 in the arrow C1 direction, the pushing force from the input gear 68 to the engaging portion 72B of the clutch spring 72 exceeds the sliding torque (overload load) that is the maximum frictional force between the curved portion 72A of the clutch spring 72 and the wind-around portion 70B of the rotor 70, the diameter of the curved portion 72A is enlarged, and sliding arises between the clutch spring 72 and the rotor 70. As a result, the OL gear 48 does not transmit rotational force in the arrow C1 direction that exceeds the sliding torque. Due thereto, at the time of operation of the pretensioner that is described later, the tension that arises at the webbing 22 becoming greater than or equal to a predetermined value is suppressed.

Note that, also when, accompanying the rotation of the rotor 70 and the output gear 74 in the arrow C2 direction, the pushing force from the engaging portion 72B of the clutch spring 72 to the input gear 68 exceeds the sliding torque (overload load) that is the maximum frictional force between the curved portion 72A of the clutch spring 72 and the wind-around portion 70B of the rotor 70, sliding arises between the clutch spring 72 and the rotor 70. As a result, the OL gear 48 does not transmit rotational force in the arrow C2 direction that exceeds the sliding torque. Due thereto, at the time of operation of the pretensioner that is described later, overload that reaches the motor 38 can be suppressed.

In contrast, when rotational force in the direction in which the input gear 68 is rotated toward the other side (in the arrow C2 direction) is applied to the input gear 68, another one of the clutch spring engaging concave portions 68B of the input gear 68 pushes the engaging portion 72B of the clutch spring 72 toward the wind-around portion 70B side of the rotor 70. Due thereto, the engagement of the engaging portion 72B of the clutch spring 72 and the clutch spring engaging concave portion 68B becomes shallow. Then, when the rotational force in the arrow C2 direction that is applied to the input gear 68 exceeds a predetermined value, the engagement of the engaging portion 72B of the clutch spring 72 and the clutch spring engaging concave portion 68B comes apart. As a result, the OL gear 48 does not transmit rotational force in the arrow C2 direction that exceeds a predetermined value.

As shown in FIG. 4, the output gear 74 has an output gear main body portion 74A, at whose outer peripheral portion are formed plural external teeth 76 that mesh-together with the C gear 50, and an engaging portion 74B that is spline-shaped and is formed integrally with the output gear main body portion 74A and engages with the engaging hole 70C that is formed in the rotor 70. Due to the engaging portion 74B of the output gear 74 engaging with the engaging hole 70C that is formed in the rotor 70, the output gear 74 and the rotor 70 are joined so as to be able to rotate integrally.

As shown in FIG. 1, the C gear 50 is formed in the shape of a disc at which are formed plural external teeth 51 that mesh-together with the external teeth 76 (see FIG. 4) of the output gear 74 that structures a portion of the OL gear 48, and with the external teeth 57 of the clutch gear 56 that structures a portion of the clutch 44. The C gear 50 rotates the clutch gear 56 due to the C gear 50 being rotated by the output gear 74 of the OL gear 48.

The above-described B gear 46, OL gear 48 and C gear 50 are, in a state of being accommodated within an accommodating concave portion 52A that is formed in the gear housing 52, rotatably supported at shaft portions that stand erect at the interior of this accommodating concave portion 52A. Further, a plate-shaped second seat 86 that covers the opening portion of the accommodating concave portion 52A is provided at the gear housing 52. A spool gear 80 and a spring holder, at which is supported a retractor spring that urges and rotates the spool 20 in the take-up direction, are fixed to the gear housing 52.

An engaging hole, that engages with the supporting shaft portion 29 of the spool 20, is formed at the spool 20 side region of the axially central portion of the spool gear 80. Due to the engaging hole of the spool gear 80 engaging with the supporting shaft portion 29 of the spool 20, the spool gear 80 and the spool 20 are joined so as to be able to rotate integrally. Further, in the present embodiment, a rotational angle sensor 110 that senses the rotational angle of the spool 20 with respect to the spool gear 80 is provided.

Figure 8:
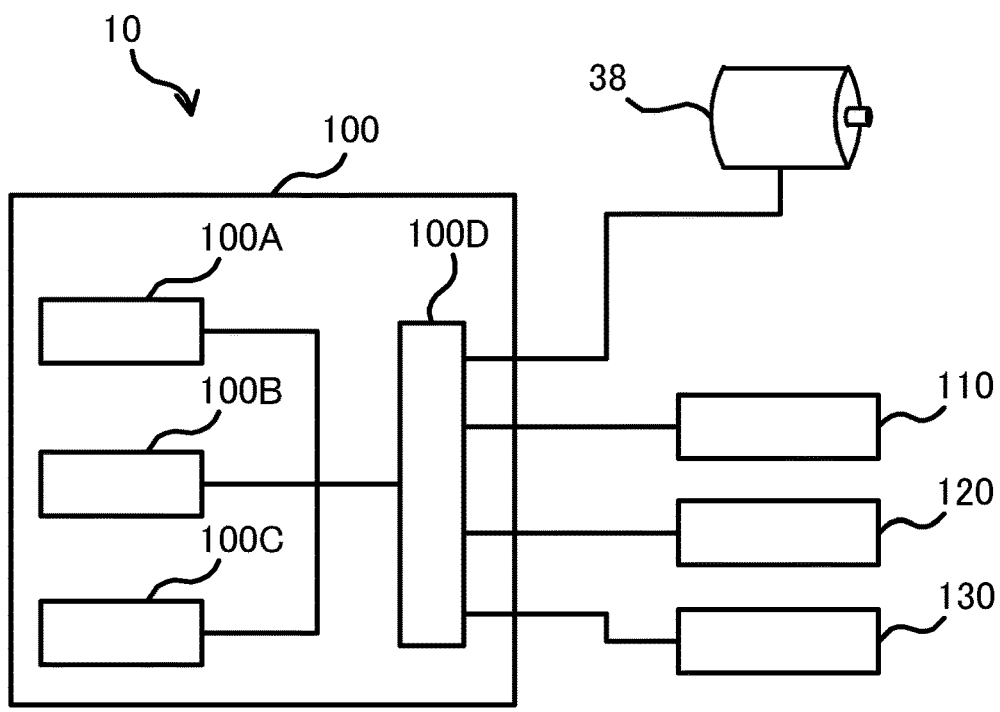
FIG. 8 is a block diagram of the webbing retractor relating to the first and second embodiments.

The control device 100, which serves as a control section that controls the rotation of the motor 38, is provided at the webbing retractor 10 of the present embodiment. As shown in FIG. 8, the control device 100 has a CPU (Central Processing Unit) 100A, a ROM (Read Only Memory) 100B, a RAM (Random Access Memory) 100C, and an input/output interface (I/O) 100D. These respective sections are connected via a bus. In addition to the motor 38, at least the rotational angle sensor 110, a collision predicting sensor 120, and an acceleration sensor 130 are electrically connected to the I/O 100D of the control device 100.

Figure 6:
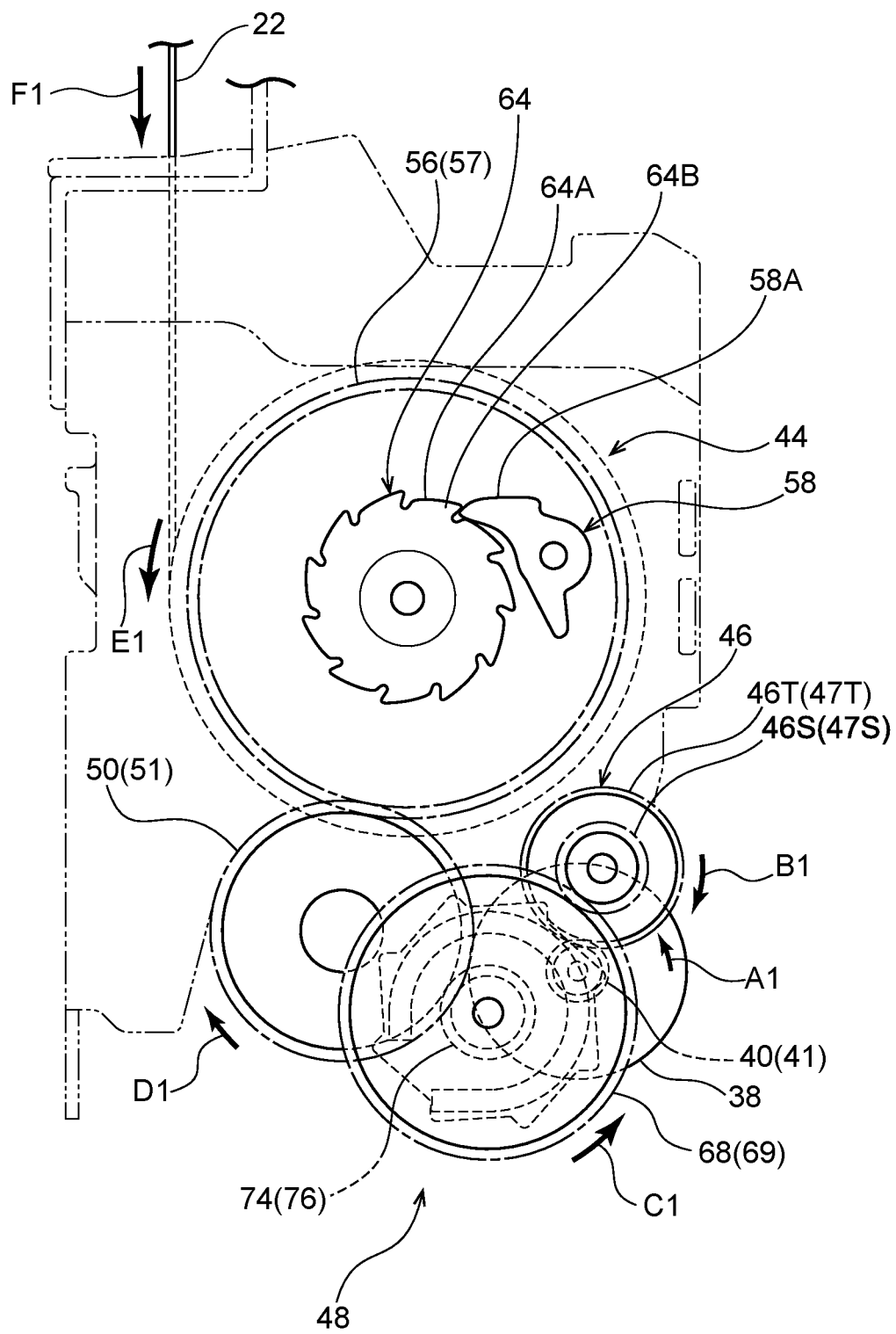
FIG. 6 is a drawing for explaining the transmission path of driving force of a motor at the time of operation of a pretensioner.

By driving the motor 38 to rotate forward, the control device 100 causes the A gear 40 to rotate in the arrow A1 direction (see FIG. 6). By driving the motor 38 to rotate reversely, the control device 100 causes the A gear 40 to rotate in the arrow A2 direction (see FIG. 7).

A magnetic sensor or optical sensor can be used for the rotational angle sensor 110. For example, in a case in which the rotational angle sensor 110 is a magnetic sensor, the angle can be acquired due to fluctuations in the magnetic flux being detected by the magnetic sensor that is in the proximity of external teeth 81 of the spool gear 80. In a case in which the rotational angle sensor 110 is an optical sensor, a striped reflecting plate is provided at the side surface of the spool gear 80, and the angle can be acquired by providing the optical sensor, that has a light emitting portion and a light receiving portion, so as to face this reflecting plate.

The collision predicting sensor 120 is a sensor, such as millimeter wave radar or an onboard camera or the like, that can acquire at least the situation at the front of the vehicle. In the present embodiment, in a case in which the collision predicting sensor 120 senses that the vehicle has rapidly approached a vehicle ahead, the control device 100 judges that a collision of the vehicle is predicted.

The acceleration sensor 130 is a sensor that is fixed to the vehicle body and senses the acceleration that arises at the vehicle. In the present embodiment, in a case in which the acceleration sensor 130 detects that the vehicle has rapidly decelerated, the control devices 100 judges that a collision of the vehicle is predicted.

Operation and Effects

Operation and Effects of the Present Embodiment are Described Next

As shown in FIG. 1, in the webbing retractor 10 of the above-described structure, when, in the stored state in which the webbing 22 is wound-up in layers on the spool 20, the webbing 22 is pulled-out while a tongue plate is pulled, the webbing 22 is pulled-out while the spool 20 is rotated in the pull-out direction against the urging force of the retractor spring that urges the spool 20 in the take-up direction.

In the state in which the webbing 22 is pulled-out in this way, the tongue plate is inserted into a buckle device while the webbing 22 is placed around the front of the body of the passenger seated in the seat, and the tongue plate is held in the buckle device. The webbing 22 is thereby applied to the body of the passenger.

Here, in a state in which the vehicle is traveling, if the collision predicting sensor 120 senses that the vehicle in which the passenger is riding has rapidly approached a preceding vehicle, or the acceleration sensor 130 senses that the vehicle has rapidly decelerated, the control device 100 drives the motor 38 to rotate forward. At this time, the driving force of the motor 38 is transmitted as follows.

As shown in FIG. 6, the output shaft of the motor 38 rotates the A gear 40 in the arrow A1 direction. When the A gear 40 is rotated in the arrow A1 direction, the B gear 46 is rotated in the arrow B1 direction by the A gear 40, and further, the OL gear 48 is rotated in the arrow C1 direction by the B gear 46. Then, the C gear 50 is rotated in the arrow D1 direction by the OL gear 48, and further, the clutch gear 56 of the clutch 44 is rotated in the arrow E1 direction by the C gear 50. Here, at the time when the clutch gear 56 is rotated in the arrow E1 direction, the ratchet engaging portion 58A of the lock bar 58 engages with the ratchet gear 64A. As a result, the rotation of the clutch gear 56 is transmitted to the ratchet wheel 64, and the spool 20 is rotated in the take-up direction together with the ratchet wheel 64. Due thereto, the webbing 22 moves in the arrow F1 direction, and is taken-up onto the spool 20, and slack in the webbing 22 that is applied to the passenger is eliminated (a so-called pretensioner").

In this way, when the pretensioner is operated in a case in which a collision of the vehicle is predicted, the body of the passenger is restrained by the webbing 22 more strongly than up until then. On the other hand, in the state in which rotation of the spool 20 in the pull-out direction is limited by the locking mechanism that is provided at the leg piece 18 side, if the body of the passenger inertially moves and load of a given amount or more is applied to the webbing 22, the force limiter mechanism operates. In detail, when the rotational force in the pull-out direction, which is applied from the webbing 22 to the spool 20 due to the inertial movement of the body of the passenger, becomes larger than the rotational load that is needed in order to torsionally deform the torsion shaft 21 around the central axis thereof, the other side (the device left side in FIG. 1) portion of the torsion shaft 21 is rotated in the pull-out direction relative to the one side (the device right side in FIG. 1) portion thereof, and the torsion shaft 21 torsionally deforms. Due thereto, some of the rotational force in the pull-out direction of the spool 20 is provided to and absorbed by this torsional deformation of the torsion shaft 21, and a length of the webbing 22, which corresponds to the amount of rotation of the spool 20 in the pull-out direction, is pulled-out from the spool 20 toward the arrow F2 side in FIG. 7. The body of the passenger can move inertially toward the vehicle front side by an amount corresponding to the amount of pushing-out of the webbing 22 from the spool 20.

Here, when the force limiter mechanism operates at the time of operation of the pretensioner, driving force from the motor 38 side (in detail, the overload load at the OL gear 48) is added to the force limiter load (the load at which pulling-out of the webbing 22 from the spool 20 by the passenger is allowed). Here, the webbing retractor 10 of the present embodiment is structured such that, in a case in which the rotational angle of the spool 20 that is sensed by the rotational angle sensor 110 exceeds a threshold value (e.g., in a case in which the spool 20 is rotated in the pull-out direction), driving force from the motor 38 side is cut-off at the clutch 44. Note that the threshold value is set such that, at the time when the rotational angle of the spool 20 reaches the threshold value, the force limiter load does not exceed a preset value (in the present embodiment, the load for the torsion shaft 21 to torsionally deform). In the present embodiment, a case in which the rotational angle of the spool 20 exceeds the threshold value corresponds to "a case in which a physical amount relating to load of the passenger exceeds a predetermined value".

Further, in a case in which, while the motor 38 is being driven to rotate forward, the rotational angle of the spool 20 exceeds the threshold value, the control device 100 drives the motor to rotate reversely such that, at the clutch 44, the clutch gear 56 rotates toward the other side (the arrow E2 direction side in FIG. 3). At this time, the driving force of the motor 38 is transmitted as follows.

Figure 7:
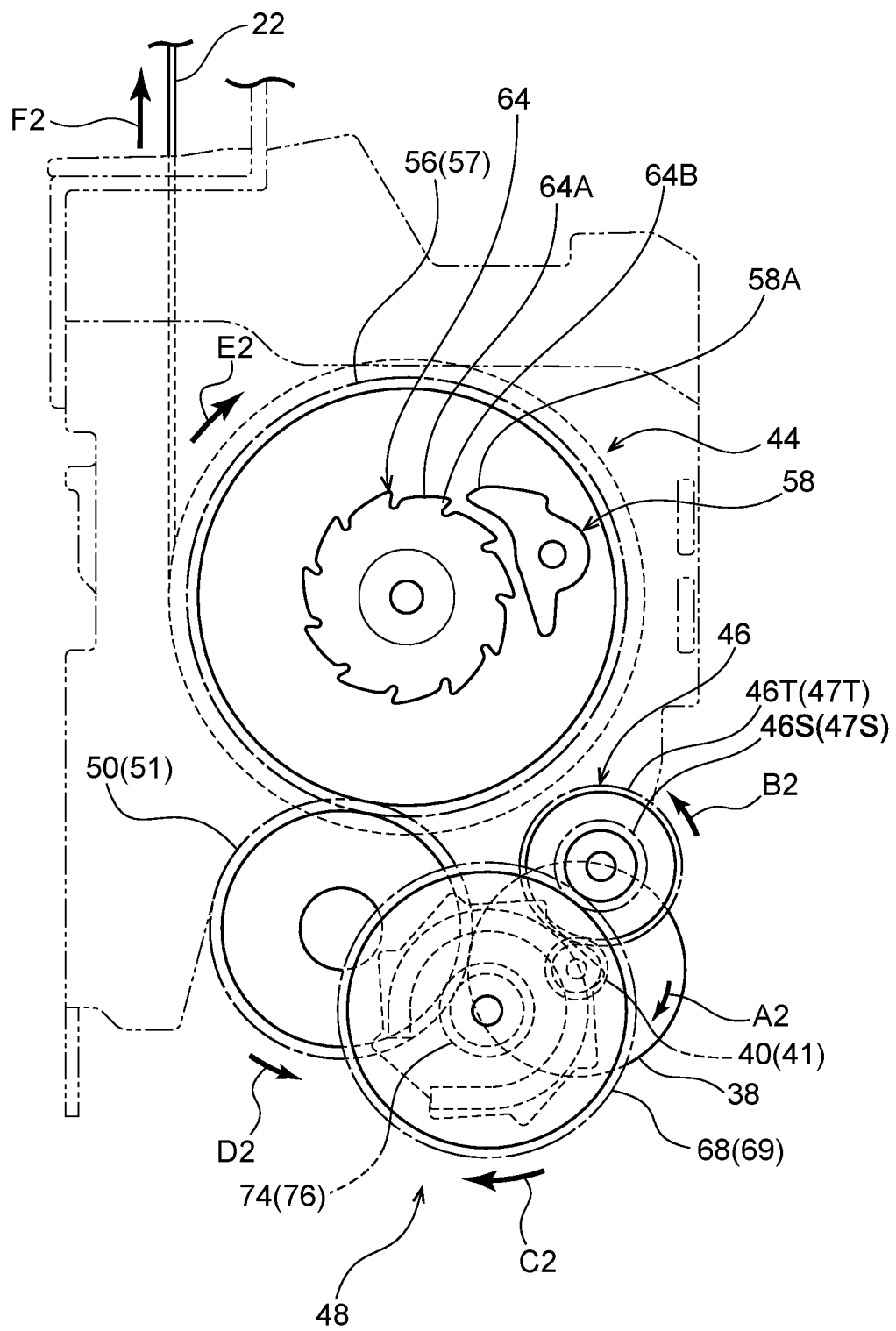
FIG. 7 is a drawing for explaining a state in which the clutch is cut-off, at the time when a force limiter mechanism operates.

As shown in FIG. 7, the output shaft of the motor 38 rotates the A gear 40 in the arrow A2 direction. When the A gear 40 is rotated in the arrow A2 direction, the B gear 46 is rotated in the arrow B2 direction by the A gear 40, and further, the OL gear 48 is rotated in the arrow C2 direction by the B gear 46. Then, the C gear 50 is rotated in the arrow D2 direction by the OL gear 48, and further, the clutch gear 56 of the clutch 44 is rotated in the arrow E2 direction by the C gear 50. Here, in a case in which the clutch gear 56 is rotated in the arrow E2 direction with respect to the ratchet wheel 64, the engagement of the ratchet engaging portion 58A of the lock bar 58 engaged with the ratchet gear 64A is cancelled. As a result, transmission of rotational force of the clutch gear 56 to the ratchet wheel 64 is cut-off, and driving force from the motor 38 side, and reaction force from the gears, and the like are not transmitted to the torsion shaft 21.

As described above, in accordance with the present embodiment, in a case in which the rotational angle of the spool 20 exceeds a threshold value while the motor 38 is being driven to rotate forward, due to the motor 38 being driven so as to rotate reversely, it is possible to suppress the addition of another force, such as driving force from the motor 38 side or the like, to the force limiter load.

On the other hand, when the rotational angle of the spool 20 reaches the threshold value, in a case in which the webbing 22 is being pulled-out, it is difficult for the engagement of the ratchet engaging portion 58A with the ratchet gear 64A to be cancelled. In this case, by rotating the clutch gear 56 toward the other side (the arrow E2 direction side) at a speed faster than the ratchet gear 64A at the clutch 44, the engaging of the ratchet engaging portion 58A with the ratchet gear 64A can be cancelled reliably.

Note that, in the present embodiment, the OL gear 48 that suppresses transmission of torque is provided on the driving path from the motor 38 to the clutch 44. Due thereto, at the time of operation of the pretensioner or at the time of operation of the force limiter mechanism, overload that reaches the motor 38 can be suppressed before the transmission of rotational force is cut-off at the clutch 44.

In the webbing retractor 10 of the present embodiment, the rotational angle of the spool 20 is the physical amount relating to the load of the passenger. Further, in the present embodiment, the rotational angle sensor 110 is provided with respect to the spool gear 80 that rotates in conjunction with the spool 20. In the present embodiment, because the rotational angle sensor 110 can be provided at any of the rotating bodies that rotate in conjunction with the spool 20, assembly into a device is easy, and compactness of the device can be devised.

In the first embodiment, in a case in which the force limiter mechanism operates at the time of operation of the pretensioner, the control device 100 cuts-off transmission of rotational force at the clutch 44 on the basis of the rotational angle of the spool 20 that is sensed by the rotational angle sensor 110. However, the method of control is not limited to this.

Second Embodiment

The webbing retractor 10 of the second embodiment uses the acceleration of the vehicle, which is acquired by the acceleration sensor 130, in the control of cutting-off the transmission of rotational force at the clutch 44. Namely, in a case in which the acceleration of the vehicle that is sensed by the acceleration sensor 130 exceeds a threshold value during the forward rotational driving of the motor 38, the control device 100 drives the motor 38 to rotate reversely such that the clutch gear 56 rotates toward the other side (the arrow E2 direction side in FIG. 3) at the clutch 44. Note that the threshold value is set such that the force limiter load does not exceed a preset value at the time when the acceleration of the vehicle reaches the threshold value. In the present embodiment, a case in which acceleration of the vehicle exceeds the threshold value corresponds to "a case in which a physical amount relating to load of the passenger exceeds a predetermined value".

In accordance with the present embodiment, the cost of the webbing retractor 10 can be kept down because the acceleration sensor 130, which is provided at the vehicle in order to sense a collision of the vehicle, can be used in common. Further, in accordance with the present embodiment, compactness of the device can be devised. Moreover, at the webbing retractor 10, acceleration G can be detected highly accurately.

Third Embodiment

Figure 9:
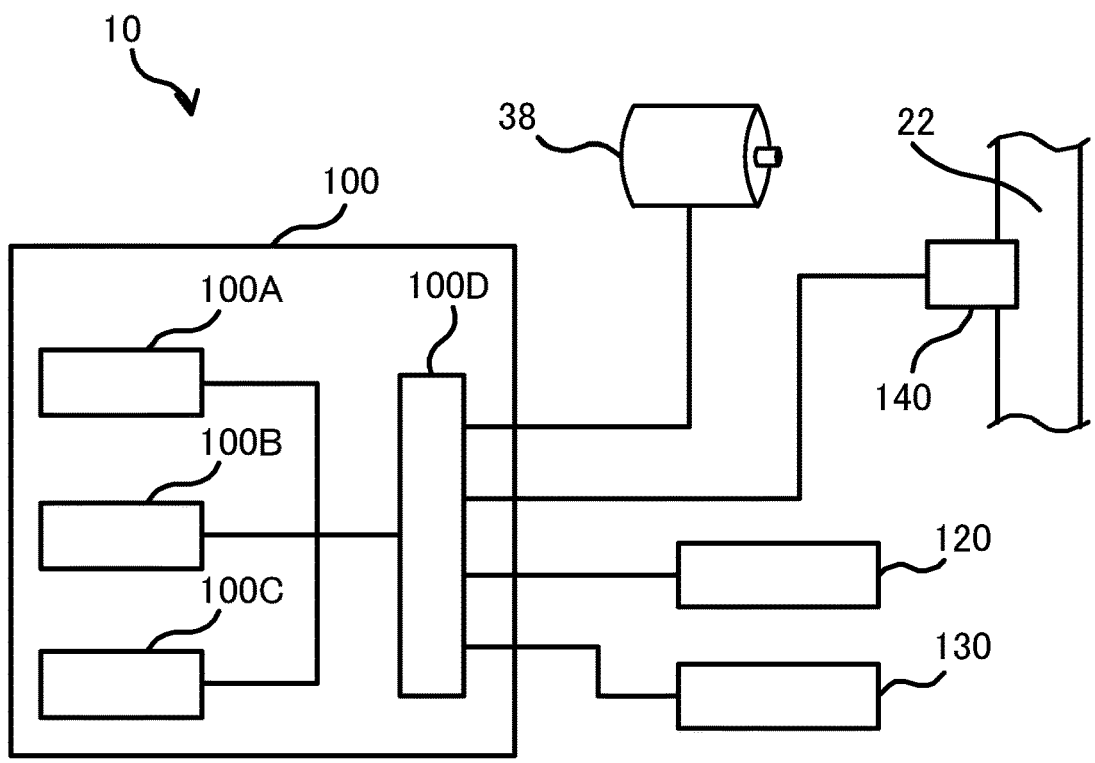
FIG. 9 is a block diagram of a webbing retractor relating to a third embodiment.

In a webbing retractor 10 of a third embodiment, an extension amount sensor 140 (see FIG. 9) that senses the amount of extension of the webbing 22 is set on the path of the webbing 22, such as at the upper portion of the frame 12 or the like. A laser displacement gauge for example can be used as the extension amount sensor 140. Further, in the present embodiment, the amount of extension of the webbing 22 that is acquired by the extension amount sensor 140 is used in the control of cutting-off the transmission of rotational force at the clutch 44. Namely, in a case in which the amount of extension of the webbing 22 that is sensed by the extension amount sensor 140 exceeds a threshold value during the forward rotational driving of the motor 38, the control device 100 drives the motor 38 to rotate reversely such that the clutch gear 56 rotates toward the other side (the arrow E2 direction side in FIG. 3) at the clutch 44. Note that the threshold value is set such that the force limiter load does not exceed a preset value at the time when the amount of extension of the webbing 22 reaches the threshold value. In the present embodiment, a case in which the amount of extension of the webbing 22 exceeds the threshold value corresponds to "a case in which a physical amount relating to load of the passenger exceeds a predetermined value".

In accordance with the present embodiment, by cutting-off driving force from the motor 38 side following the extending of the webbing 22 that accompanies movement of the passenger, effects of the driving force from the motor 38 side on the force limiter load can be eliminated at an early stage.

Fourth Embodiment

Figure 10:
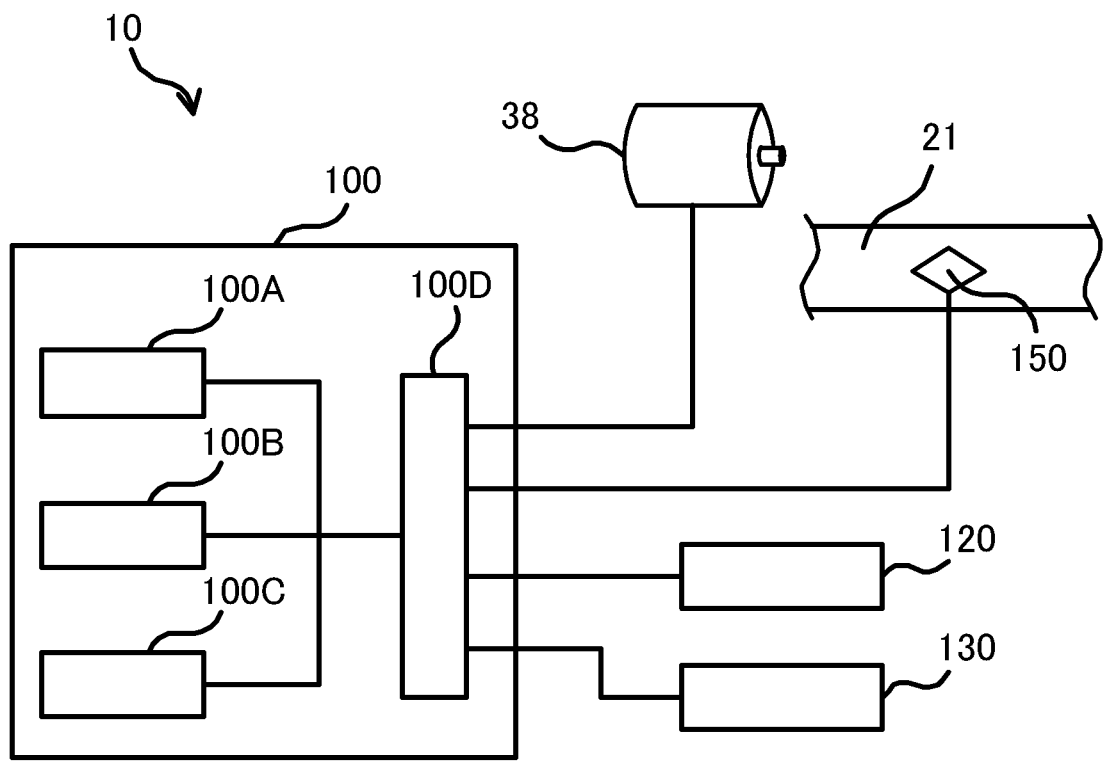
FIG. 10 is a block diagram of a webbing retractor relating to a fourth embodiment.

The sensor that the control device 100 uses in the control to cut-off transmission of rotational force at the clutch 44 is not limited to the sensors of the above-described respective embodiments. As shown in FIG. 10, in the fourth embodiment, a strain gauge 150, which is a strain sensor that detects the amount of strain, can be provided at the torsion shaft 21, and the amount of strain of the torsion shaft 21 that is acquired from the strain gauge 150 can be used in the control by the control device 100. Concretely, the control device 100 computes the load value of the webbing 22 on the basis of the amount of strain acquired from the strain gauge 150, and drives the motor 38 to rotate reversely in a case in which this load value exceeds a threshold value. In this case, a case in which the load value of the webbing 22 exceeds the threshold value corresponds to "a case in which a physical amount relating to load of the passenger exceeds a predetermined value".

Fifth Embodiment

Figure 11:
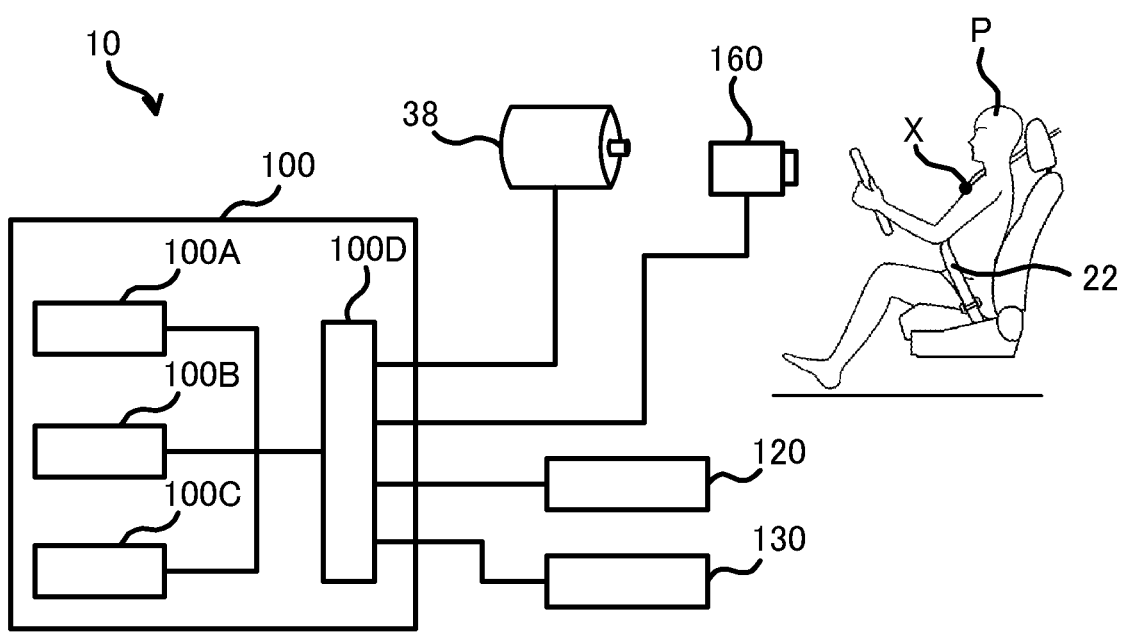
FIG. 11 is a block diagram of a webbing retractor relating to a fifth embodiment.

As shown in FIG. 11, a camera 160 that captures images of a passenger P can be provided within the vehicle, and the movement of the passenger P that is captured by the camera 160 can be used in the control by the control device 100.

Concretely, the control device 100 computes the amount of movement of reference point X, which is set at the head portion or the chest portion or the like of the passenger P, from images of the passenger P that are captured by the camera 160. Then, the control device 100 drives the motor 38 to rotate reversely in a case in which the amount of movement of the reference point X reaches a threshold value. In this case, a case in which the amount of movement of the reference point X at the passenger P exceeds a threshold value corresponds to "a case in which a physical amount relating to load of the passenger exceeds a predetermined value".

Additional Points

At the clutch 44 of the above-described respective embodiments, the lock bar 58 that serves as the pawl body is provided at the clutch gear 56 that serves as the first rotating body, and the ratchet gear 64A is formed at the outer peripheral portion of the ratchet wheel 64 that serves as the second rotating body, but the structure may be made to be the opposite. Namely, a ratchet gear may be formed at a gear that serves as the first rotating body, which is at the side where driving force from the motor 38 side is inputted, and a lock bar may be provided at a wheel that serves as the second rotating body, which is at the output side and rotates the spool 20.

Although embodiments of the present disclosure have been described above, the present invention is not limited to the above, and can of course be implemented by being modified in various ways other than the above.

What is claimed is:

1. A webbing retractor comprising:
   a spool that takes-up a webbing that is applied to a passenger;
   a motor that drives the spool to rotate;
   a force limiter mechanism that allows pulling-out of the webbing in a case in which load of a given amount or more is applied to the webbing, pulling-out of the webbing being limited;
   a first rotating body that is rotated due to driving force of the motor being transmitted thereto;
   a second rotating body that, by being rotated, rotates the spool;
   a ratchet gear that is provided at one of the first rotating body or the second rotating body;
   a pawl body that is provided at another of the first rotating body or the second rotating body, and that can engage with the ratchet gear in a case in which the first rotating body rotates toward one side, and engagement of the pawl body with the ratchet gear being cancelled in a case in which the first rotating body rotates toward another side; and
   a control section that, in a case in which a collision of a vehicle is predicted, drives the motor to rotate forward such that the first rotating body rotates toward the one side, and, in a case in which a physical amount relating to load of the passenger exceeds a predetermined value during forward rotational driving, drives the motor to rotate in reverse, such that the first rotating body rotates toward the other side.

2. The webbing retractor of claim 1, wherein, in a case in which the physical amount relating to the load of the passenger exceeds the predetermined value during forward rotational driving of the motor, the control section drives the motor to rotate in reverse, such that the first rotating body rotates toward the other side at a speed higher than the second rotating body.

3. The webbing retractor of claim 1, further comprising a third rotating body that is provided on a driving path from the motor to the first rotating body, and that suppresses transmission of torque of a set value or greater.

4. The webbing retractor of claim 1, further comprising a rotational angle sensor that senses a rotational angle of the spool,
   wherein the control section causes a case in which the rotational angle exceeds a threshold value to be the case in which the physical amount relating to the load of the passenger exceeds the predetermined value.

5. The webbing retractor of claim 1, further comprising an acceleration sensor that senses acceleration of the vehicle,
   wherein the control section causes a case in which acceleration exceeds a threshold value to be the case in which the physical amount relating to the load of the passenger exceeds the predetermined value.

6. The webbing retractor of claim 5, wherein the control section predicts a collision of the vehicle in a case in which the acceleration sensor detects that the vehicle has rapidly decelerated.

7. The webbing retractor of claim 1, further comprising an extension amount sensor that senses an amount of extension of the webbing,
   wherein the control section causes a case in which the amount of extension exceeds a threshold value to be the case in which the physical amount relating to the load of the passenger exceeds the predetermined value.

8. The webbing retractor of claim 1, further comprising:
   a torsion shaft that structures the force limiter mechanism and that torsionally deforms the spool; and
   a strain sensor that is provided at the torsion shaft and that detects an amount of strain of the torsion shaft,
   wherein the control section causes a case in which a load value of the webbing, which is computed from the amount of strain, exceeds a threshold value to be the case in which the physical amount relating to the load of the passenger exceeds the predetermined value.

9. The webbing retractor of claim 1, further comprising a camera that captures images of the passenger,
   wherein the control section:
   computes an amount of movement of a reference point, which is provided at the passenger, from images of the passenger that are captured by the camera, and
   causes a case in which the amount of movement exceeds a threshold value to be the case in which the physical amount relating to the load of the passenger exceeds the predetermined value.

* * * * *